US010950225B2

United States Patent
Asami et al.

(10) Patent No.: US 10,950,225 B2
(45) Date of Patent: Mar. 16, 2021

(54) ACOUSTIC MODEL LEARNING APPARATUS, METHOD OF THE SAME AND PROGRAM

(71) Applicant: NIPPON TELEGRAPH AND TELEPHONE CORPORATION, Chiyoda-ku (JP)

(72) Inventors: Taichi Asami, Yokosuka (JP); Takashi Nakamura, Yokosuka (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 85 days.

(21) Appl. No.: 16/337,081

(22) PCT Filed: Sep. 27, 2017

(86) PCT No.: PCT/JP2017/034942
§ 371 (c)(1),
(2) Date: Mar. 27, 2019

(87) PCT Pub. No.: WO2018/062265
PCT Pub. Date: Apr. 5, 2018

(65) Prior Publication Data
US 2020/0035223 A1 Jan. 30, 2020

(30) Foreign Application Priority Data

Sep. 30, 2016 (JP) .............................. JP2016-193533

(51) Int. Cl.
G10L 15/16 (2006.01)
G10L 15/06 (2013.01)
(Continued)

(52) U.S. Cl.
CPC .............. G10L 15/16 (2013.01); G06F 17/18 (2013.01); G06N 3/0472 (2013.01); G10L 15/063 (2013.01)

(58) Field of Classification Search
CPC ....... G10L 15/16; G10L 15/063; G10L 15/06; G06F 17/18; G06N 3/0472; G06N 3/08; G06N 3/0454; G06N 7/005
(Continued)

(56) References Cited

U.S. PATENT DOCUMENTS 10,515,301 B2 * 12/2019 Li ............................ G06N 3/08
2015/0161522 A1 * 6/2015 Saon ..................... G06N 3/0454
706/12
(Continued)

OTHER PUBLICATIONS

International Search Report dated Dec. 19, 2017 in PCT/JP2017/034942 filed on Sep. 27, 2017.
(Continued)

Primary Examiner — Edwin S Leland, III
(74) Attorney, Agent, or Firm — Oblon, McClelland, Maier & Neustadt, L.L.P.

(57) ABSTRACT

An acoustic model learning apparatus includes a first output probability distribution calculating part that calculates a first output probability distribution including a distribution of output probabilities of respective units of an output layer using a feature amount obtained from an acoustic signal for learning and a learned first acoustic model including a neural network, and the first output probability distribution calculating part obtains the first output probability distribution using a smoothing parameter made up of a real value greater than 0 as input so that the first output probability distribution approaches a uniform distribution as the smoothing parameter is greater, and calculates the first output probability distribution by obtaining logits of respective units of an output layer using the feature amount obtained from the acoustic signal for learning and the first acoustic model and setting a value of the smoothing parameter greater in the case where an output unit number with the greatest logit value is different from a correct unit number than in the case where the output unit number with the greatest logit value matches the correct unit number.

9 Claims, 16 Drawing Sheets

(51) Int. Cl.
*G06N 3/04* (2006.01)
*G06F 17/18* (2006.01)

(58) Field of Classification Search
USPC .......................................................... 704/232
See application file for complete search history.

(56) References Cited

U.S. PATENT DOCUMENTS

| | | | |
|---|---|---|---|
| 2015/0161995 A1* | 6/2015 | Sainath | G10L 15/063 |
| | | | 704/232 |
| 2017/0011738 A1* | 1/2017 | Senior | G10L 15/063 |
| 2017/0032244 A1* | 2/2017 | Kurata | G06N 3/0454 |
| 2017/0243114 A1* | 8/2017 | Kurata | G06N 3/0472 |
| 2019/0244604 A1* | 8/2019 | Masataki | G06N 99/00 |
| 2020/0035223 A1* | 1/2020 | Asami | G06N 3/08 |
| 2020/0110982 A1* | 4/2020 | Gou | G06F 16/904 |

OTHER PUBLICATIONS

Hinton, G. et al., "Deep Neural Networks for Acoustic Modeling in Speech Recognition," IEEE Signal Processing Magazine, vol. 29, No. 6, 2012, pp. 82-97.
Hinton, G. et al., "Distilling the Knowledge in a Neural Network," in Proceedings of Deep Learning and Representation Learning Workshop in NIPS, 2014, pp. 1-9.

* cited by examiner

ACOUSTIC MODEL LEARNING APPARATUS, METHOD OF THE SAME AND PROGRAM

TECHNICAL FIELD

The present invention relates to an acoustic model learning apparatus, a method thereof and a program for learning an acoustic model to be used for speech recognition or the like.

BACKGROUND ART

Non-Patent Literature 1 is known as related art of an acoustic model learning method. A typical learning method of a neural network is illustrated in FIG. 1. A method for learning a neural network-type acoustic model (hereinafter, simply referred to as an "acoustic model") for speech recognition using this learning method is disclosed in a section called "TRAINING DEEP NEURAL NETWORKS" of Non-Patent Literature 1 (hereinafter, also referred to as "Related Art 1").

A pair of a feature amount (real vector) O extracted from each sample of learning data and a correct unit number $j_L$ corresponding to each feature amount O, and an appropriate initial model are prepared in advance. For example, as the initial model, a neural network in which a random number is allocated to each parameter, a neural network which has already learned with other learning data, or the like, can be utilized. An output probability distribution calculating part 81 inputs the feature amount O of the learning data in a current model (acoustic model which is being learned) to calculate an output probability distribution in which output probabilities p(j) of respective units j of an output layer are arranged.

A model updating part 82 calculates a loss function C from the correct unit number $j_L$ and the distribution of output probabilities p(j), and updates the model so that a value of the loss function C decreases. The above-described processing of calculating the output probabilities and updating the model is repeated for each pair of the feature amount O of the learning data and the correct unit number $j_L$. A model at a time point at which a predetermined number of repetition times (normally, from several tens of millions to several hundreds of millions) is completed is utilized as a learned acoustic model.

Further, a method for transferring knowledge which has already been learned and is held by the neural network to a neural network which newly learns is disclosed in Non-Patent Literature 2 (hereinafter, also referred to as Related Art 2). A configuration of Related Art 2 is illustrated in FIG. 2.

Related Art 2 is similar to Related Art 1 in that a pair of a feature amount O and a correct unit number $j_L$ and an initial model (in FIG. 2, described as a "student model" for convenience sake) are prepared in advance. In addition, in Related Art 2, a teacher model which is a neural network which has already learned is prepared in advance. Related Art 2 is different from Related Art 1 in that a teacher output probability distribution calculating part 91 is provided, and the model updating part 82 is replaced with a corrected model updating part 92. The teacher output probability distribution calculating part 91 inputs the feature amount O of the learning data in a teacher model to calculate a distribution of output probabilities $p_1(j)$ in which probabilities of respective units j of an output layer are arranged (hereinafter, also simply referred to as teacher output probability distribution). Note that Related Art 2 is different from Related Art 1 in that a temperature T is introduced in a calculation equation for obtaining the teacher output probability distribution. The temperature T is a real-valued parameter which is set in advance and is greater than 0. The corrected model updating part 92 performs processing while replacing the loss function C of the model updating part 82 (see FIG. 1) with the following loss function C'.

[Formula 1]

$$C' = -(1-\alpha)\sum_j d_j \log p_j - \alpha \sum_j q_j \log p_j \quad (1)$$

This loss function C' is a weighted sum of the original loss function C (first term) of the model updating part 82 and a cross entropy (second term) of distribution of the output probabilities $q_j$ of the teacher model and distribution of the output probabilities $p_j$ of the student model. Weight $\alpha$ is a parameter which is set in advance and is equal to or greater than 0 and equal to or less than 1.

In Related Art 2, an effect is confirmed that a model which has accuracy equivalent to that of the teacher model and which requires a short calculation period can be learned by using a huge model (which has high accuracy but requires a long calculation period) which has been learned in advance as the teacher model and using a small model which is initialized with a random number as the student model, and by setting the temperature T=2, and the weight $\alpha$=0.5. Note that the huge model means a model which has a large number of intermediate layers of the neural network and a large number of units in the respective intermediate layers.

PRIOR ART LITERATURE

Non-Patent Literature

Non-Patent Literature 1: Geoffrey Hinton, Li Deng, Dong Yu, George E. Dahl, Abdel-rahman Mohamed, Navdeep Jaitly, Andrew Senior, Vincent Vanhoucke, Patric Nguyen, Tara N. Sainath and Brian Kingsbury, "Deep Neural Networks for Acoustic Modeling in Speech Recognition," IEEE Signal Processing Magazine, Vol. 29, No 6, pp. 82-97, 2012.

Non-Patent Literature 2: Geoffrey Hinton, Oriol Vinyals and Jeff Dean, "Distilling the Knowledge in a Neural Network," in Proceedings of Deep Learning and Representation Learning Workshop in NIPS 2014.

SUMMARY OF THE INVENTION

Problems to be Solved by the Invention

However, with Related Art 1, there is a case where a problem of over-learning occurs in the case where there is little learning data, and an acoustic model with low recognition accuracy can be learned. The over-learning is a phenomenon that, while the learning data can be recognized with extremely high accuracy, data which is not included in the learning data (input from a user upon actual operation of speech recognition service) cannot be recognized at all.

Further, with Related Art 2, a problem of over-learning which occurs in the case where there is little learning data is avoided by transferring knowledge from the acoustic model which has already been learned with other learning data.

However, with Related Art 2, because the student model is learned so as to imitate behavior of the teacher model, data which is erroneously recognized by the teacher model is also erroneously learned by the student model. With such a problem, it becomes difficult to create an acoustic model with high accuracy in the case where there is little learning data.

The present invention is directed to providing an acoustic model learning apparatus, method thereof and program which reduce a problem of errors in the teacher model and which are capable of creating an acoustic model with high accuracy.

Means to Solve the Problems

To solve the above-described problem, according to an aspect of the present invention, an acoustic model learning apparatus comprises a first output probability distribution calculating part that calculates a first output probability distribution including a distribution of output probabilities of respective units of an output layer using a feature amount obtained from an acoustic signal for learning and a learned first acoustic model including a neural network, a second output probability distribution calculating part that calculates a second output probability distribution including a distribution of output probabilities of respective units of an output layer using the feature amount obtained from the acoustic signal for learning, and a second acoustic model which is different from the first acoustic model and which includes a neural network, and a corrected model updating part that calculates a second loss function from a correct unit number corresponding to the acoustic signal for learning and the second output probability distribution, calculates a cross entropy of the first output probability distribution and the second output probability distribution, obtains a weighted sum of the second loss function and the cross entropy, and updates a parameter of the second acoustic model so that the weighted sum decreases, the first output probability distribution calculating part obtains the first output probability distribution using a smoothing parameter made up of a real number value greater than 0 as input so that the first output probability distribution approaches a uniform distribution as the smoothing parameter is greater, and calculates the first output probability distribution by obtaining logits of respective units of an output layer using the feature amount obtained from the acoustic signal for learning and the first acoustic model, and setting a value of the smoothing parameter greater in the case where an output unit number with the greatest logit value is different from the correct unit number, than in the case where the output unit number with the greatest logit value matches the correct unit number.

To solve the above-described problem, according to another aspect of the present invention, an acoustic model learning apparatus comprises a first output probability distribution calculating part that calculates a first output probability distribution including a distribution of output probabilities of respective units of an output layer using a feature amount obtained from an acoustic signal for learning and a learned first acoustic model including a neural network, a second output probability distribution calculating part that calculates a second output probability distribution including a distribution of output probabilities of respective units of an output layer using a feature amount obtained from an acoustic signal for learning and a second acoustic model which is different from the first acoustic model and which includes a neural network, a first output probability distribution correcting part that sets a distribution of output probabilities in which, in the case where, among logits of respective units of an output layer obtained using the feature amount obtained from the acoustic signal for learning and the first acoustic model, an output unit number with the greatest logit value is different from the correct unit number, an output probability of an output unit corresponding to the output unit number with the greatest logit value is replaced with an output probability of an output unit corresponding to the correct unit number in the first output probability distribution, as a corrected first output probability distribution, and a corrected model updating part that calculates a second loss function from the correct unit number corresponding to the acoustic signal for learning and the second output probability distribution, calculates a cross entropy of the corrected first output probability distribution and the second output probability distribution, obtains a weighted sum of the second loss function and the cross entropy and updates a parameter of the second acoustic model so that the weighted sum decreases.

To solve the above-described problem, according to another aspect of the present invention, an acoustic model learning method comprises a first output probability distribution calculating step of calculating a first output probability distribution including a distribution of output probabilities of respective units of an output layer using a feature amount obtained from an acoustic signal for learning and a learned first acoustic model including a neural network, a second output probability distribution calculating step of calculating a second output probability distribution including a distribution of output probabilities of respective units of an output layer using a feature amount obtained from an acoustic signal for learning, and a second acoustic model which is different from the first acoustic model and which includes a neural network, and a corrected model updating step of calculating a second loss function from a correct unit number corresponding to the acoustic signal for learning and the second output probability distribution, calculating a cross entropy of the first output probability distribution and the second output probability distribution, obtaining a weighted sum of the second loss function and the cross entropy, and updating a parameter of the second acoustic model so that the weighted sum decreases, and, in the first output probability distribution calculating step, the first output probability distribution is obtained using a smoothing parameter made up of a real number value greater than 0 as input so that the first output probability distribution approaches a uniform distribution as the smoothing parameter is greater, and the first output probability distribution is calculated by obtaining logits of respective units of an output layer using the feature amount obtained from the acoustic signal for learning and the first acoustic model, and setting a value of the smoothing parameter greater in the case where an output unit number with the greatest logit value is different from a correct unit number, than in the case where the output unit number with the greatest logit value matches the correct unit number.

To solve the above-described problem, according to another aspect of the present invention, an acoustic model learning method comprises a first output probability distribution calculating step of calculating a first output probability distribution including a distribution of output probabilities of respective units of an output layer using a feature amount obtained from an acoustic signal for learning and a learned first acoustic model including a neural network, a second output probability distribution calculating step of calculating a second output probability distribution including a distribution of output probabilities of respective units of an output layer using a feature amount obtained from an acoustic signal for learning, and a second acoustic model which is different from the first acoustic model and which includes a neural network, a first output probability distribution correcting step of setting a distribution of output probabilities in which, in the case where, among logits of respective units of an output layer obtained using the feature amount obtained from the acoustic signal for learning and the first acoustic model, an output unit number with the greatest logit value is different from a correct unit number, an output probability of an output unit corresponding to the output unit number with the greatest logit value is replaced with an output probability of an output unit corresponding to the correct unit number in the first output probability distribution, as a corrected first output probability distribution, and a corrected model updating step of calculating a second loss function from a correct unit number corresponding to the acoustic signal for learning and the second output probability distribution, calculating a cross entropy of the corrected first output probability distribution and the second output probability distribution, obtaining a weighted sum of the second loss function and the cross entropy, and updating a parameter of the second acoustic model so that the weighted sum decreases.

Effects of the Invention

According to the present invention, it is possible to provide an effect that a problem of errors in a teacher model can be reduced, and an acoustic model with high accuracy can be created.

DETAILED DESCRIPTION OF THE EMBODIMENTS

Figure 1:
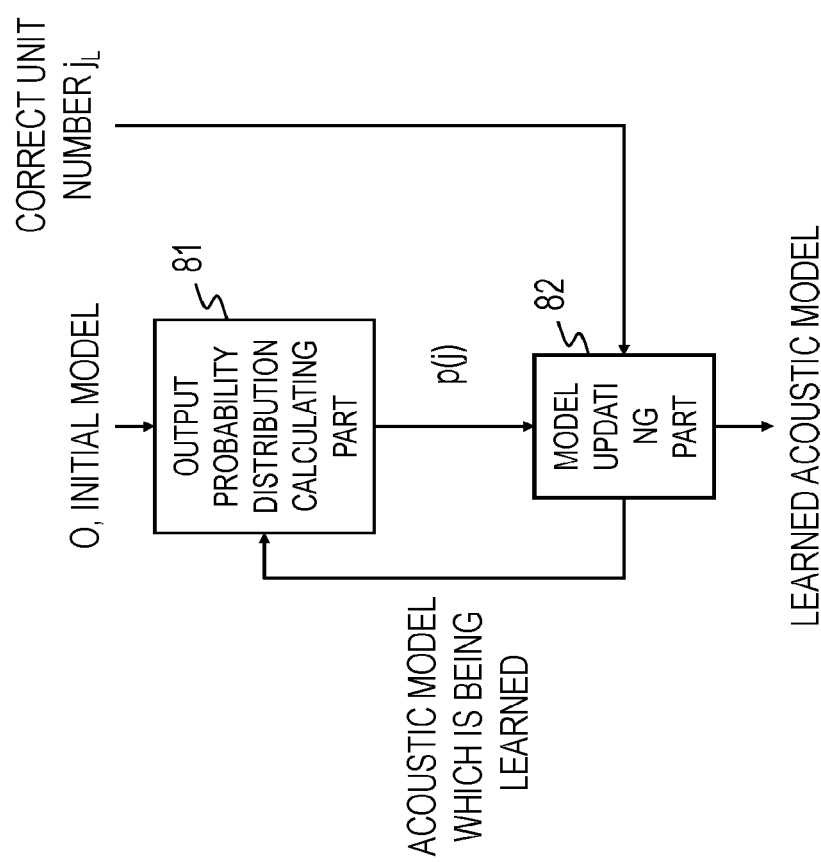
FIG. 1 is a functional block diagram of an acoustic model learning apparatus according to related art.
Figure 2:
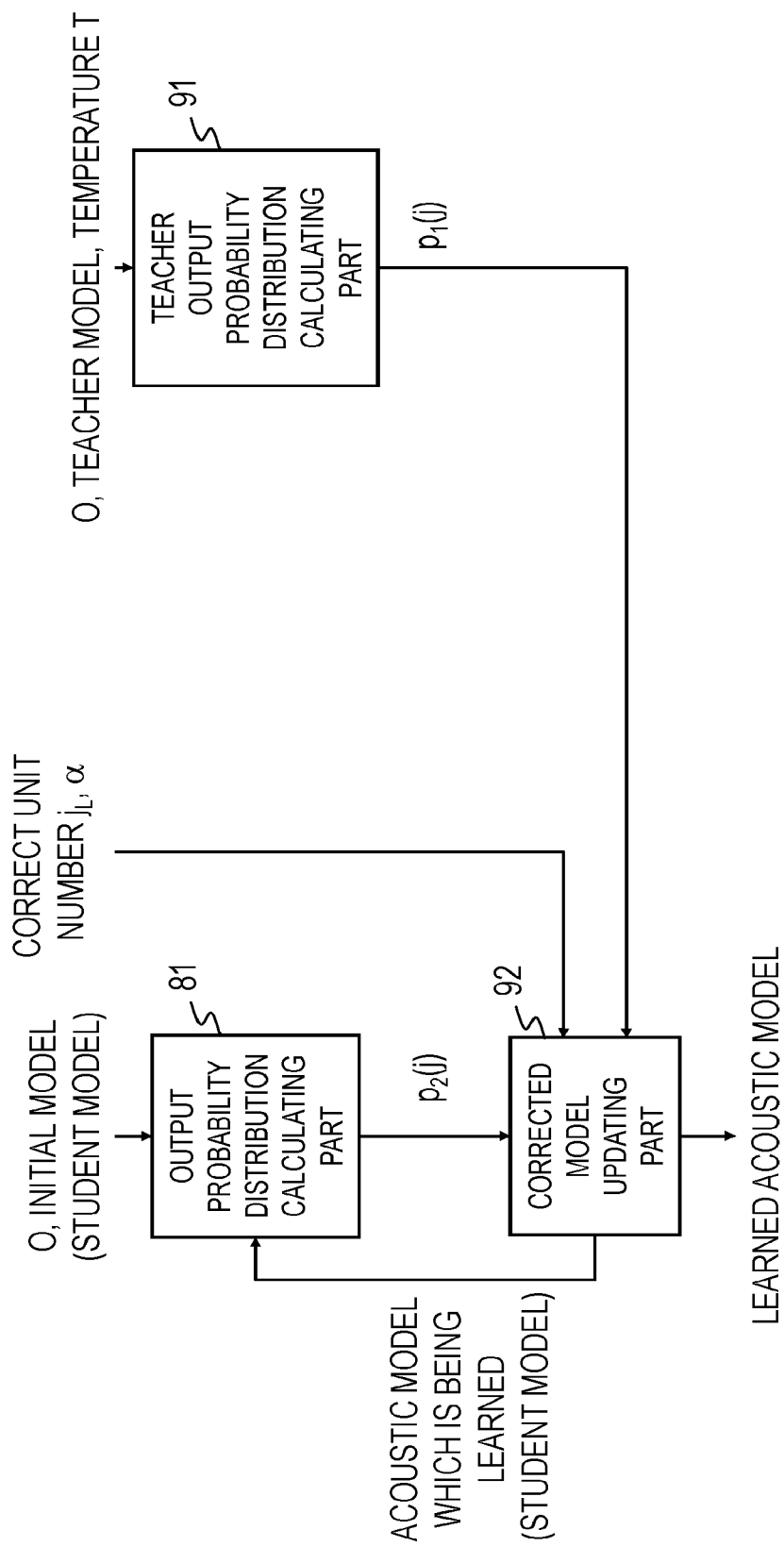
FIG. 2 is a functional block diagram of an acoustic model learning apparatus according to related art.

Embodiments of the present invention will be described below. Note that, in the drawings used for description below, the same reference numerals will be assigned to components having the same functions and steps for performing the same processing, and overlapped description will be omitted. Further, processing performed in units of elements of a vector or a matrix is applied to all the elements of the vector or the matrix unless otherwise specified.

Points of First Embodiment

In Related Art 2, it is necessary to prepare a huge teacher model for an acoustic model to be generated. Therefore, cost for preparing the teacher model is high, and it takes time to generate the acoustic model because a teacher model which requires a long calculation period is used. In the present embodiment, it is possible to create an acoustic model which enables speech recognition with high accuracy using less learning data without need of a huge teacher model as in Related Art 2.

A point of the present embodiment is that a problem of over-learning which occurs in the case where there is little learning data is avoided by transferring knowledge from an acoustic model which has already been learned with other learning data. Specifically, in a framework of Related Art 2, a limitation that the teacher model and the student model has neural networks of the same structure is imposed. Under this limitation, an acoustic model which has already been learned with other learning data is used as the teacher model, and a copy of the teacher model is set as an initial value of the student model. With such a configuration, it is possible to perform learning so that learning data can be correctly recognized and, at the same time, obtain knowledge for successfully recognizing data which is not included in the learning data from the teacher model without need of a huge teacher model as in the related art.

First Embodiment

Figure 3:
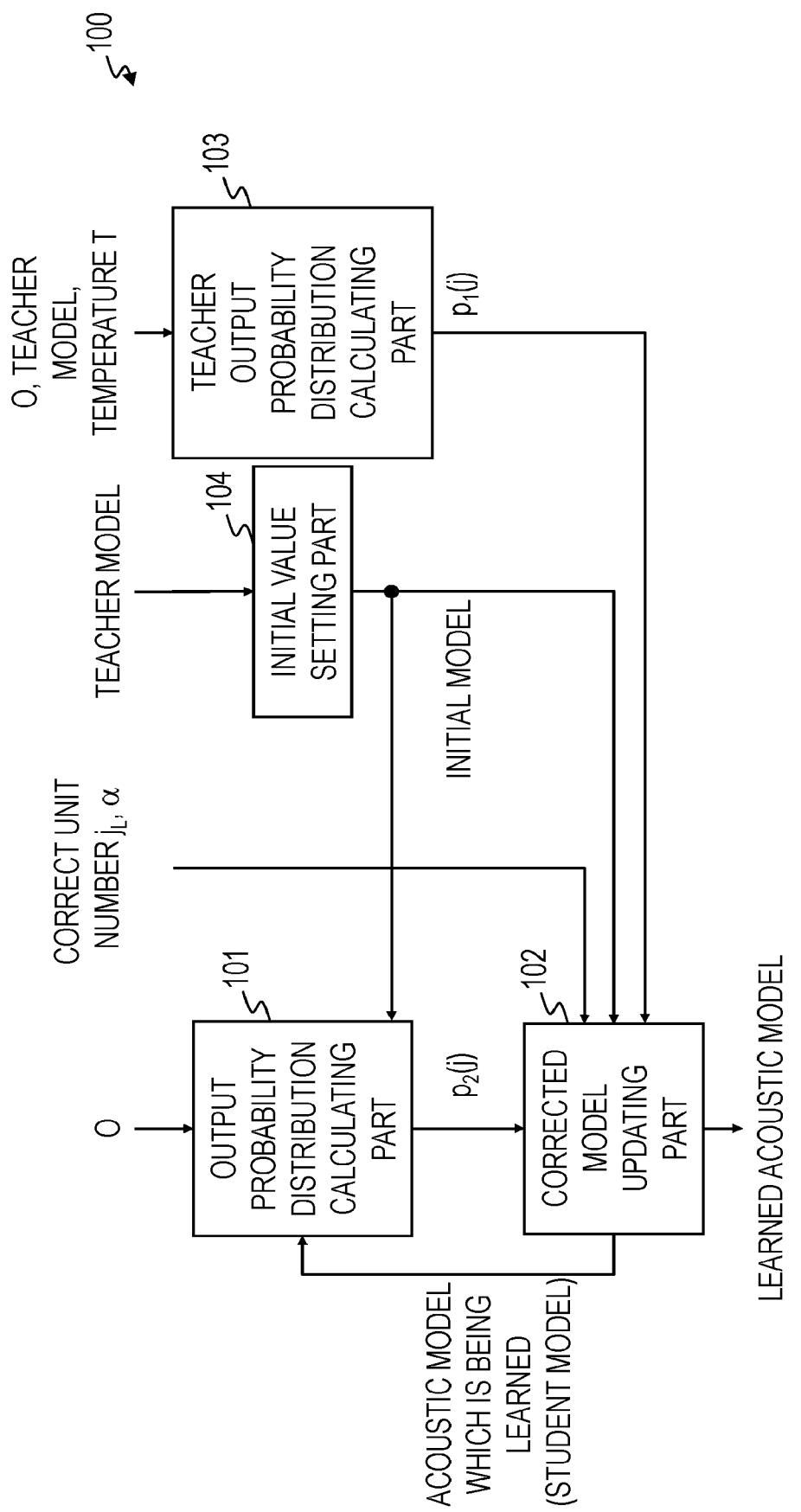
FIG. 3 is a functional block diagram of an acoustic model learning apparatus according to a first embodiment.
Figure 4:
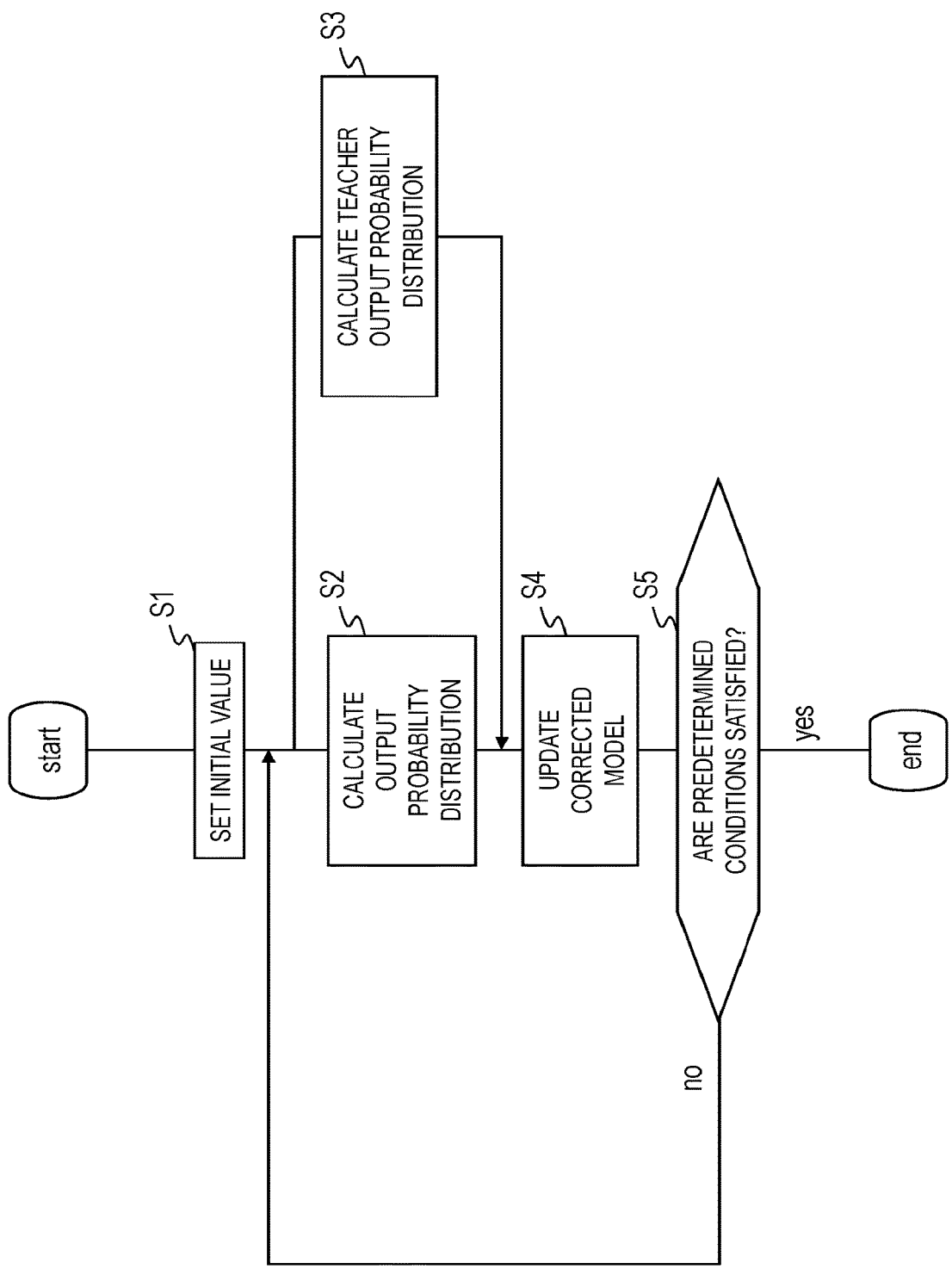
FIG. 4 is a diagram illustrating an example of a processing flow of the acoustic model learning apparatus according to the first embodiment.

FIG. 3 illustrates a functional block diagram of an acoustic model learning apparatus according to a first embodiment, and FIG. 4 illustrates a processing flow thereof.

An acoustic model learning apparatus 100 includes an output probability distribution calculating part 101, a corrected model updating part 102, a teacher output probability distribution calculating part 103 and an initial value setting part 104. The first embodiment is different from Related Art 2 mainly in that the initial value setting part 104 is added, and in accordance with this, a base acoustic model (teacher model) and an acoustic model (student model) are limited to ones including a neural network having the same structure.

<Initial Value Setting Part 104>
Input: teacher model
Output: initial model of student model A parameter of the acoustic model (student model) including a neural network having a structure similar to that of an acoustic model (teacher model) is set using a parameter of the learned acoustic model (teacher model) including a neural network (S1). For example, a model obtained by copying the parameter of the input teacher model is created, and output as an initial model of the student model. This processing is performed only once upon start of learning. While, in Related Art 2, a huge model is assumed as the teacher model, and a small model is assumed as the student model, in the present embodiment, the teacher model and the student model have completely the same structure. Through this processing of the initial value setting part 104, an acoustic model with high accuracy can be learned with less learning data than that in Related Art 1.

<Output Probability Distribution Calculating Part 101>
Input: feature amount O for learning, student model (student model being learned or initial model of student model)
Output: output probability distribution (distribution of output probabilities $p_2(j)$)

The output probability distribution calculating part 101 calculates an output probability distribution including a distribution of output probabilities $p_2(j)$ of respective units of an output layer using a feature amount O obtained from the acoustic signal for learning and the student model (S2). Any known technique may be used as a method for calculating the output probabilities $p_2(j)$, and an optimum method may be selected as appropriate in accordance with a usage environment, or the like. For example, the output probabilities $p_2(j)$ can be obtained using the method in Related Art 1. In this case, first, the feature amount O is input in the student model, and a logit $x_j$ of a unit j of an output layer is obtained (see the following equations).

[Formula 2]
$$x_j = b_j + \sum_i y_i w_{ij} \quad (2)$$

$$y_j = \text{logistic}(x_j) = \frac{1}{1+e^{-x_j}} \quad (3)$$

where logistic( ) indicates a logistic function, $b_j$ indicates a bias of the unit j, i indicates an index of a unit in a lower layer, and $w_{ij}$ indicates weight with respect to connection from a unit i in a lower layer to the unit j. The feature amount O for learning is used to obtain input of the unit j in an input layer, and the student model includes $b_j$, $w_{ij}$, or the like.

The output probabilities $p_2(j)$ are obtained from the logit $x_j$ next (see the following equation).

[Formula 3]
$$p_2(j) = \frac{\exp(x_j)}{\sum_k \exp(x_k)} \quad (4)$$

Note that the acoustic model learning apparatus 100 may receive an acoustic signal for learning in a time domain as input, and may include a frequency domain converting part, a feature amount extracting part, or the like, which are not illustrated. For example, the frequency domain converting part which is not illustrated converts an acoustic signal for learning in a time domain into a signal in a frequency domain and outputs the signal. The feature amount extracting part which is not illustrated extracts a feature amount O for learning from an acoustic signal for learning in the time domain or in the frequency domain and outputs the feature amount O for learning to the output probability distribution calculating part 101. Examples of the feature amount can include, for example, a basic frequency, power, a duration, a formant frequency, a spectrum, a Mel-Frequency Cepstral Coefficient (MFCC), or the like.

<Teacher Output Probability Distribution Calculating Part 103>
Input: feature amount O for learning, teacher model, temperature T
Output: output probability distribution (distribution of output probabilities $p_1(j)$)

The teacher output probability distribution calculating part 103 calculates an output probability distribution including a distribution of output probabilities $p_1(j)$ of respective units of the output layer using the feature amount O obtained from the acoustic signal for learning, the teacher model and the temperature T (S3). Any known technique may be used as a method for calculating the output probabilities $p_1(j)$, and an optimum method may be selected as appropriate in accordance with a usage environment, or the like. For example, the output probabilities $p_1(j)$ can be obtained using the method in Related Art 2. In this case, the output probabilities $p_1(j)$ are expressed with the following equation.

[Formula 4]
$$p_1(j) = \frac{\exp(x_j/T)}{\sum_k \exp(x_k/T)} \quad (5)$$

Note that, while the method for calculating the logit $x_j$ is the same as that performed by the output probability distribution calculating part 101, the teacher output probability distribution calculating part 103 uses the teacher model instead of the student model. Note that the temperature T is a real-valued parameter which is greater than 0 and which is set in advance, and as T is set greater, the distribution of the output probabilities $p_1(j)$ approaches a uniform distribution (non-information), and a degree of influence on updating of the student model which will be described later becomes smaller. Note that the temperature T will be also referred to as a smoothing parameter T.

<Corrected Model Updating Part 102>
Input: initial model, output probability distribution of output probabilities $p_1(j)$, output probability distribution of output probabilities $p_2(j)$, correct unit number $j_L$, weight $\alpha$
Output: acoustic model (student model) which is being learned or learned acoustic model The corrected model updating part 102 calculates a loss function $C_2$ from a correct unit number $j_L$ corresponding to the acoustic signal for learning (corresponding to the feature amount for learning) and output probabilities $p_2(j)$ (see equation (6)).

[Formula 5]
$$C_2 = -\sum_j d_j \log p_2(j) \quad (6)$$

where $d_j$ is a value which becomes 1 in the case where j matches the correct unit number $j_L$, and which becomes 0 in the case where j does not match the correct unit number $j_L$.

Then, the corrected model updating part 102 calculates a cross entropy $C_1$ of the output probability distribution of the output probabilities $p_1(j)$ and the output probability distribution of the output probabilities $p_2(j)$ (a sum of products of the output probabilities $p_1(j)$ and logarithms of the output probabilities $p_2(j)$) (see equation (7)).

[Formula 6]

$$C_1 = -\sum_j p_1(j)\log p_2(j) \qquad (7)$$

Further, the corrected model updating part 102 obtains a weighted sum C of the loss function $C_2$ and the cross entropy $C_1$ (see equation (8)).

$$C=(1-\alpha)C_2+\alpha C_1 \qquad (8)$$

Note that weight $\alpha$ is a parameter which is set in advance and which is equal to or greater than 0 and equal to or less than 1.

Finally, the corrected model updating part 102 updates a parameter of the student model so that the weighted sum C decreases (S4).

The above-described S2 to S4 is repeated until predetermined conditions are satisfied (S5), and, in the case where the predetermined conditions are satisfied, the student model at that time is output as the learned acoustic model.

Examples of the predetermined conditions can include, for example, (i) the number of times of repetition exceeding a fixed number (for example, from several tens of millions to several hundreds of millions), (ii) an updating amount becoming less than a predetermined value, for example, (ii-a) a sum of updating amounts of all parameters becoming less than the predetermined value, or (ii-b) updating amounts of all or part of respective parameters becoming less than predetermined values which are respectively set, or the like.

<Effects>

By using the acoustic model created in the present embodiment, it is possible to perform speech recognition with higher accuracy than the related arts, so that it is possible to improve convenience for a user of the speech recognition system. Further, it is possible to create an acoustic model with learning data less than that in the related arts. Therefore, it is possible to reduce an amount of learning data required upon development of the speech recognition system, and it is possible to shorten a period required for learning an acoustic model. By this means, it is possible to reduce learning data creation cost upon development of the speech recognition system, and acoustic model creation cost.

Modified Example

While, in the present embodiment, the temperature T is input at the teacher output probability distribution calculating part 103, the temperature T does not have to be necessarily used. For example, it is possible to obtain an output probability distribution using the method in Related Art 1 without using the temperature T. However, at the teacher output probability distribution calculating part 103, the teacher model is used to obtain $x_j$ instead of using the student model.

Points of Second Embodiment

Parts different from the first embodiment will be mainly described.

In Related Art 2, there is a problem that, among the learning data, data which cannot be correctly recognized by the teacher model negatively affects learning. In Related Art 2, because the student model is learned so as to imitate behavior of the teacher model, data erroneously recognized by the teacher model is also erroneously learned by the student model. With such a problem, it becomes difficult to create an acoustic model with high accuracy in the case where there is little learning data.

Points of the present embodiment lie in that a problem of errors in the teacher model is reduced, and an acoustic model with further higher accuracy is created by the correct unit number $j_L$ being taken into account at the teacher output probability calculating part. Specifically, an error in the teacher model is detected by the teacher output probability distribution being checked against the correct unit number $j_L$, and, in the case where there is an error, the temperature T is increased. By this means, it is possible to suppress influence of the error in the teacher model being transferred to the student model.

Second Embodiment

Parts different from the first embodiment will be mainly described.

Figure 5:
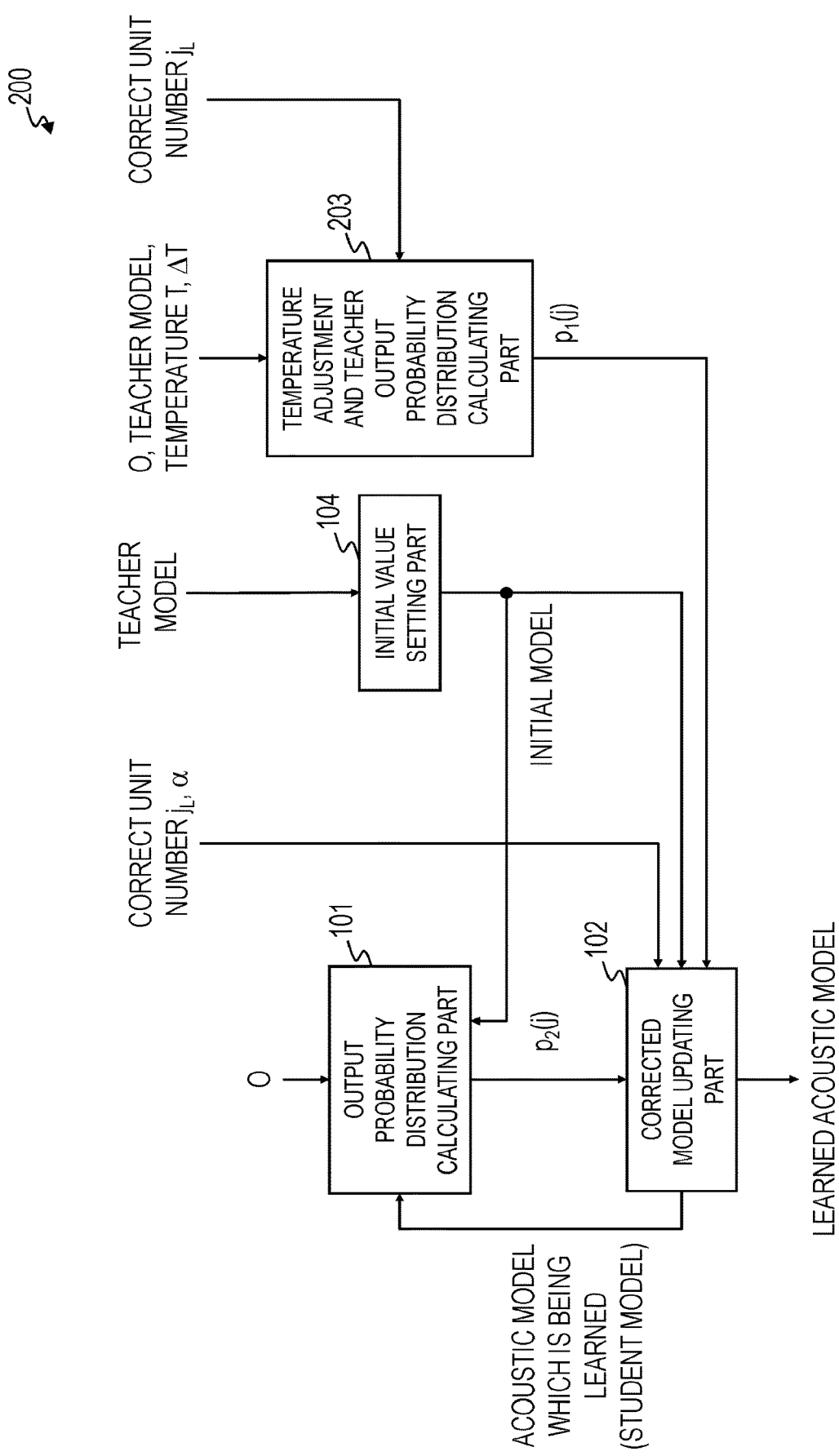
FIG. 5 is a functional block diagram of an acoustic model learning apparatus according to a second embodiment.
Figure 6:
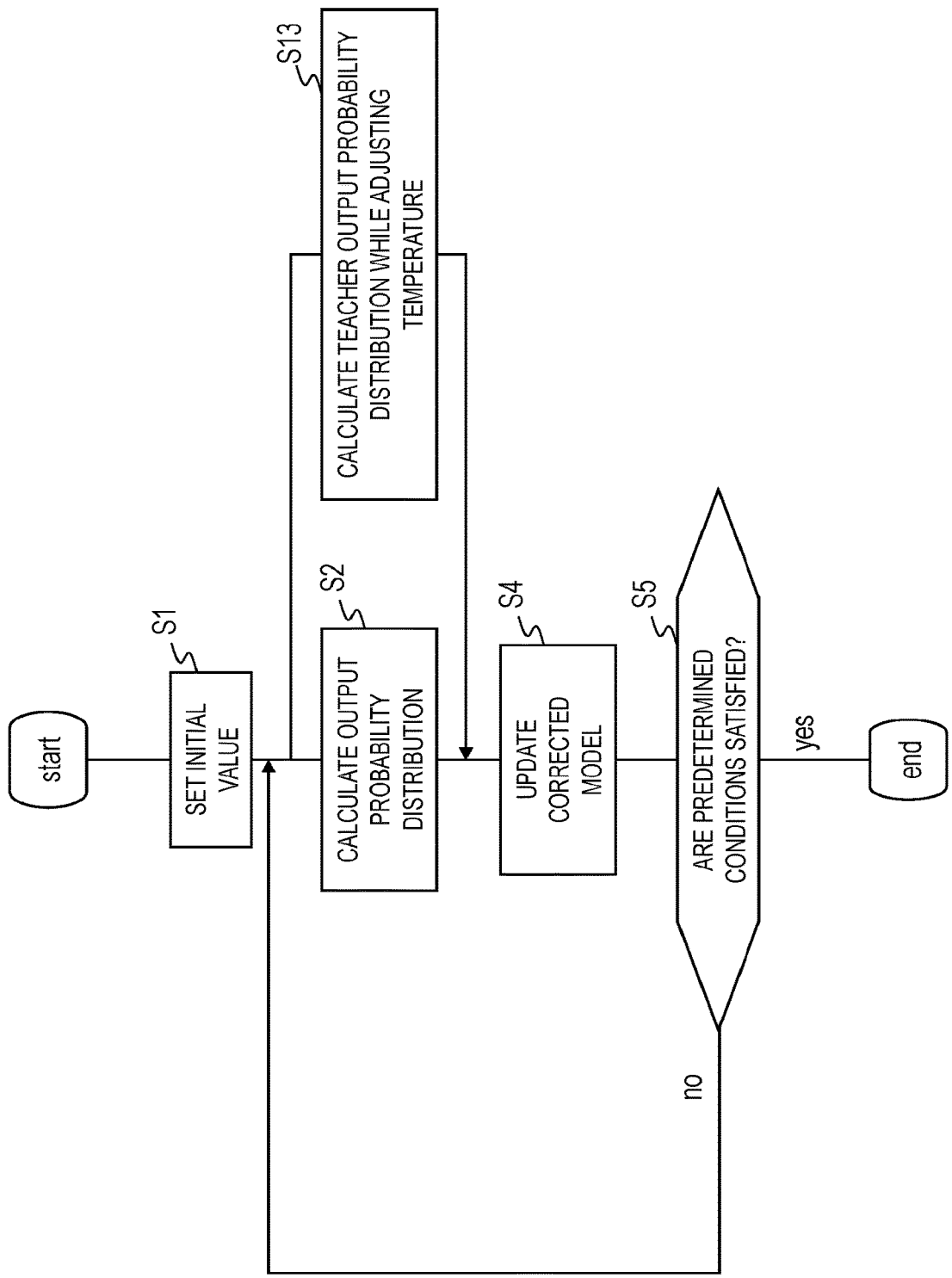
FIG. 6 is a diagram illustrating an example of a processing flow of the acoustic model learning apparatus according to the second embodiment.

FIG. 5 illustrates a functional block diagram of an acoustic model learning apparatus according to a second embodiment, and FIG. 6 illustrates a processing flow thereof.

The acoustic model learning apparatus 200 includes the output probability distribution calculating part 101, the corrected model updating part 102, a temperature adjustment and teacher output probability distribution calculating part 203, and the initial value setting part 104. The second embodiment is different from the first embodiment mainly in that the teacher output probability distribution calculating part 103 is replaced with the temperature adjustment and teacher output probability distribution calculating part 203.

<Temperature Adjustment and Teacher Output Probability Distribution Calculating Part 203>

Input: feature amount O, teacher model, correct unit number $j_L$, temperature T, temperature adjustment width $\Delta T$ Output: output probability distribution (distribution of output probabilities $p_1(j)$)

The teacher output probability distribution calculating part 203 calculates an output probability distribution including a distribution of output probabilities $p_1(j)$ of respective units of an output layer using the feature amount O obtained from the acoustic signal for learning, the teacher model, the temperature T and the temperature adjustment width $\Delta T$ (S13).

For example, the teacher output probability distribution calculating part 203 inputs the input feature amount O in the teacher model, and calculates a logit $x_j$ in equation (2).

The teacher output probability distribution calculating part 203 then specifies an output unit number K with the greatest logit $x_j$ value.

[Formula 7]

$$K = \arg\max_j x_j \qquad (11)$$

Further, the teacher output probability distribution calculating part 203 determines whether or not K is equal to the correct unit number $j_L$. In the case where K is equal to the correct unit number $j_L$, the distribution of the output probabilities $p_1(j)$ is calculated using the temperature T as is with the following equation (12), and output. In the case where K is different from the correct unit number $j_L$, the distribution of the output probabilities $p_1(j)$ is calculated with the following equation (12) after the temperature T is replaced with T+ΔT, and output.

[Formula 8]

$$p_1(j) = \frac{\exp(x_j/T_1)}{\sum_k \exp(x_k/T_1)} \quad (12)$$

$$T_1 = \begin{cases} T & (K = j_L) \\ T + \Delta T & (K \neq j_L) \end{cases}$$

<Effects>

As described above, as the temperature T is increased, the distribution of the output probabilities $p_1(j)$ in equation (12) approaches a uniform distribution (non-information), and a degree of influence on updating of the student model becomes smaller. Therefore, with such processing, in the case where the teacher model has an error (K is different from the correct unit number $j_L$), it is possible to suppress negative influence of the error on learning.

Note that the temperature adjustment width ΔT is a parameter set in advance, and, for example, set at a value of ΔT=approximately 5 to 10.

Modified Example

It is also possible to employ a configuration not including the initial value setting part 104. In this case, the acoustic model learning apparatus 200 includes the output probability distribution calculating part 101, the corrected model updating part 102, and the temperature adjustment and teacher output probability distribution calculating part 203.

Figure 7:
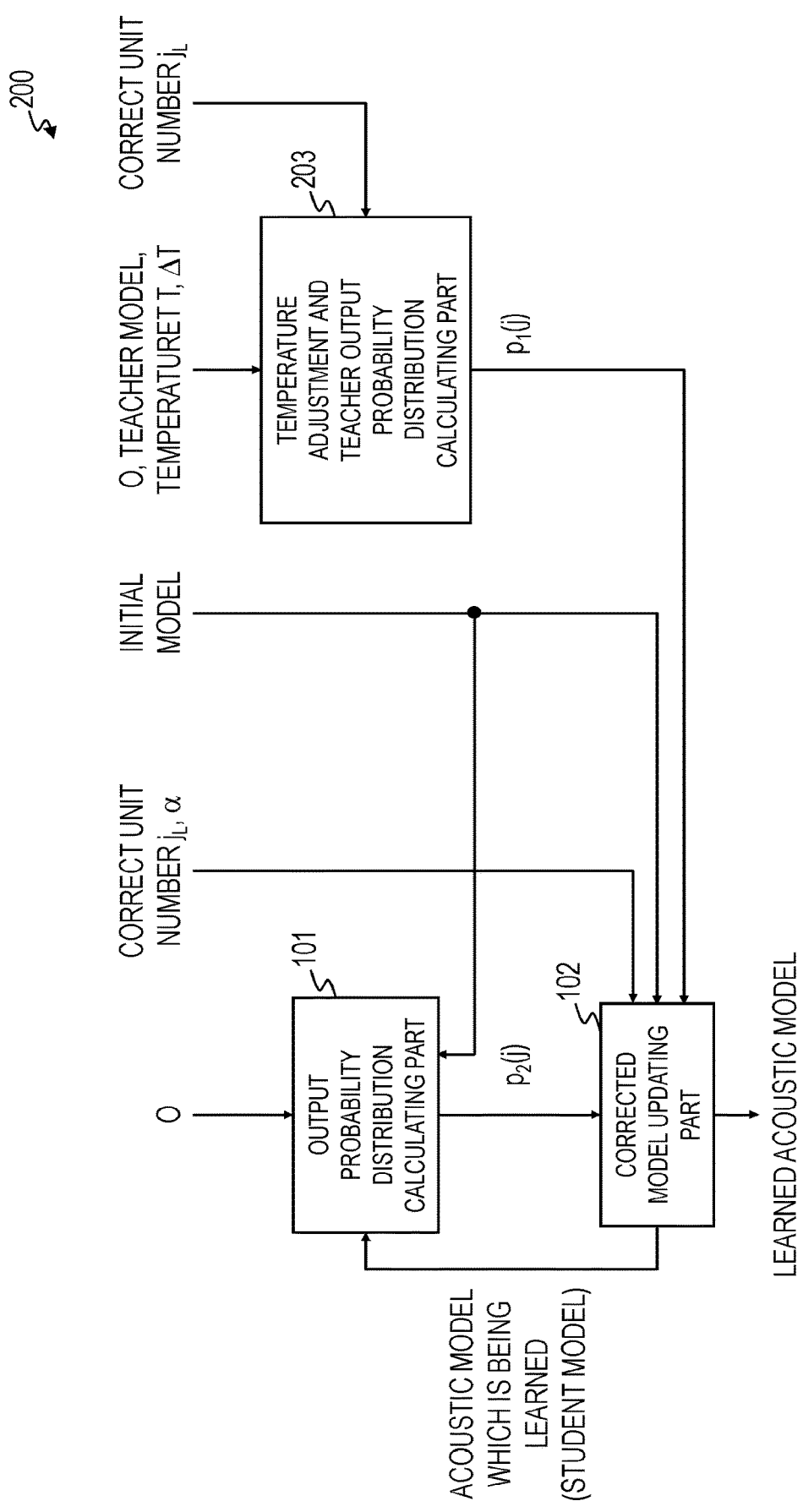
FIG. 7 is a functional block diagram of an acoustic model learning apparatus according to a modified example of the second embodiment.
Figure 8:
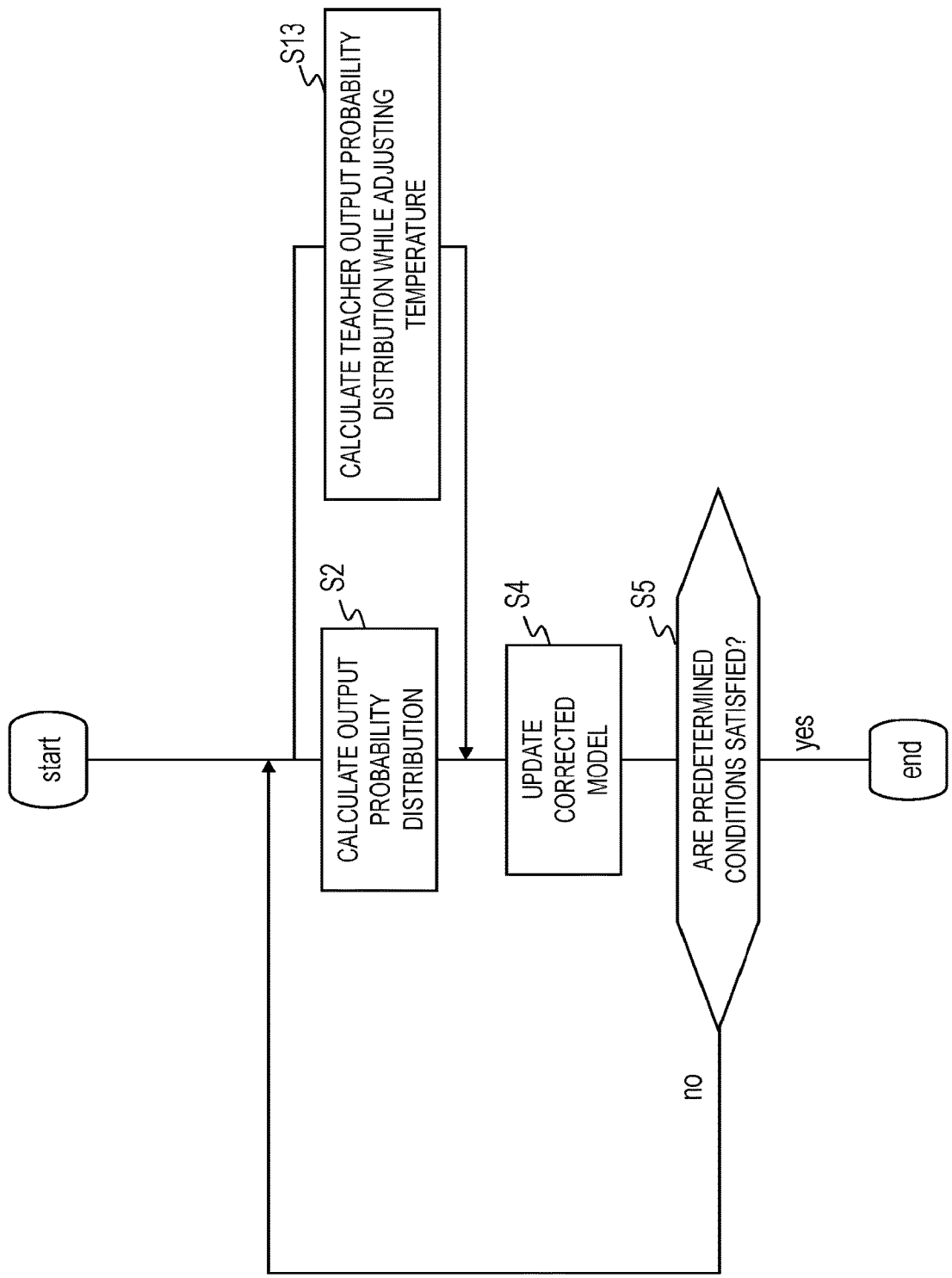
FIG. 8 is a diagram illustrating an example of a processing flow of the acoustic model learning apparatus according to the modified example of the second embodiment.

FIG. 7 illustrates a functional block diagram of an acoustic model learning apparatus according to a modified example of the second embodiment, and FIG. 8 illustrates a processing flow thereof.

The modified example is different from the second embodiment mainly in that the initial value setting part 104 is not provided. Further, in the present modified example, neural networks of the teacher model and the student model are not limited to ones having the same structure. That is, a neural network included in the teacher model used at the temperature adjustment and teacher output probability distribution calculating part 203 in the second embodiment may have a structure different from that of a neural network included in the teacher model in the present modified example. Note that, at the output probability distribution calculating part 101 and the corrected model updating part 102, a neural network in which random numbers are allocated to respective parameters, a neural network which has already been learned with other learning data, or the like, can be utilized as an initial model in a similar manner to the related arts. For example, the learned neural network utilized here has the same structure as that of the neural network included in the student model.

Even with such a configuration, it is possible to reduce a problem of errors in the teacher model and create an acoustic model with high accuracy.

Points of Third Embodiment

Parts different from the second embodiment will be mainly described.

In the present embodiment, to solve the problem (problem of errors in the teacher model) described in the second embodiment, for example, an error in the teacher model is detected by the distribution of the output probabilities $p_1(j)$ being checked against the correct unit number $j_L$, and, in the case where there is an error, a probability of a unit corresponding to the correct unit number $j_L$ is increased. By this means, it is possible to suppress influence of the error in the teacher model to be transferred to the student model.

Third Embodiment

Figure 9:
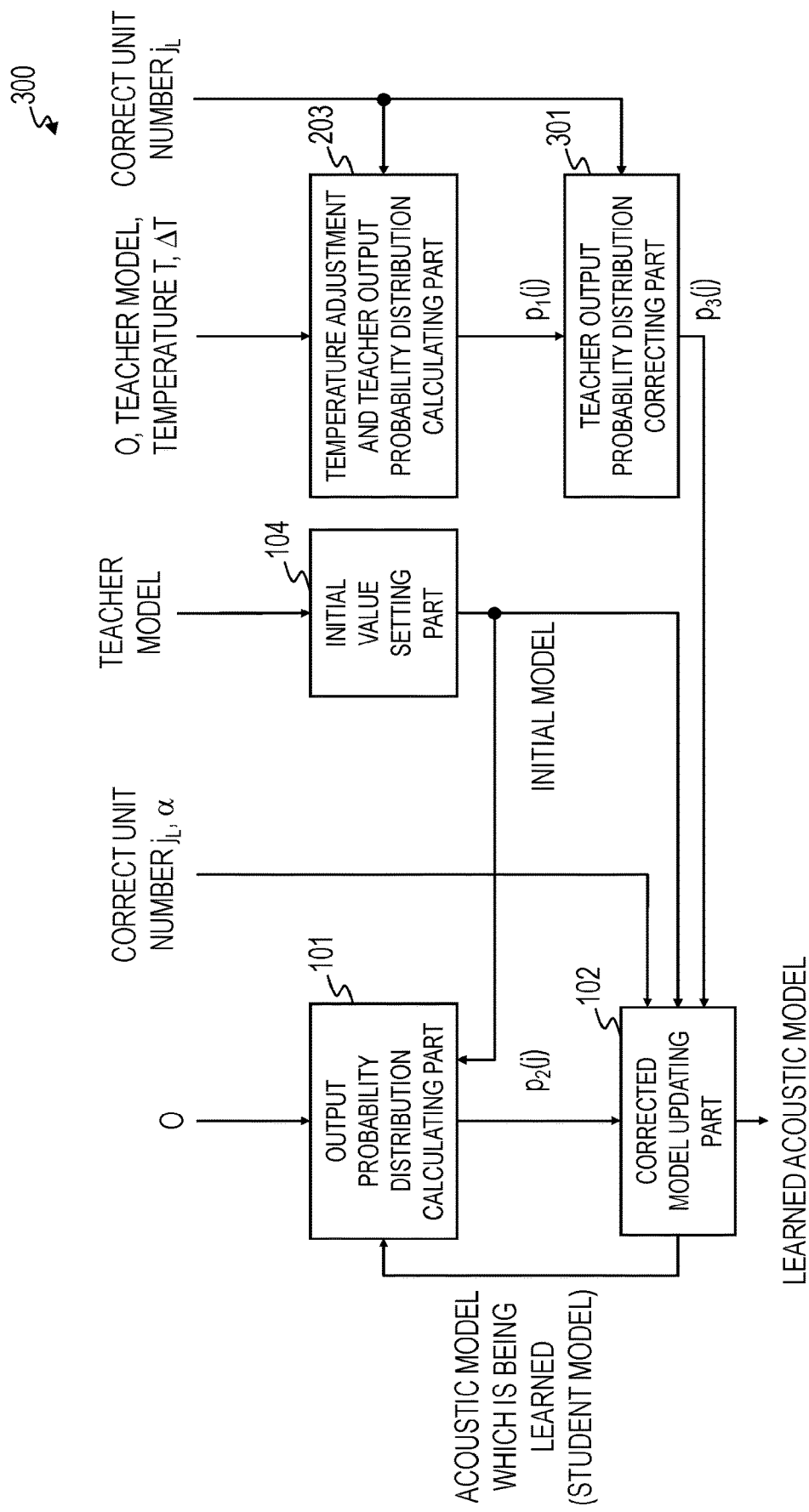
FIG. 9 is a functional block diagram of an acoustic model learning apparatus according to a third embodiment.
Figure 10:
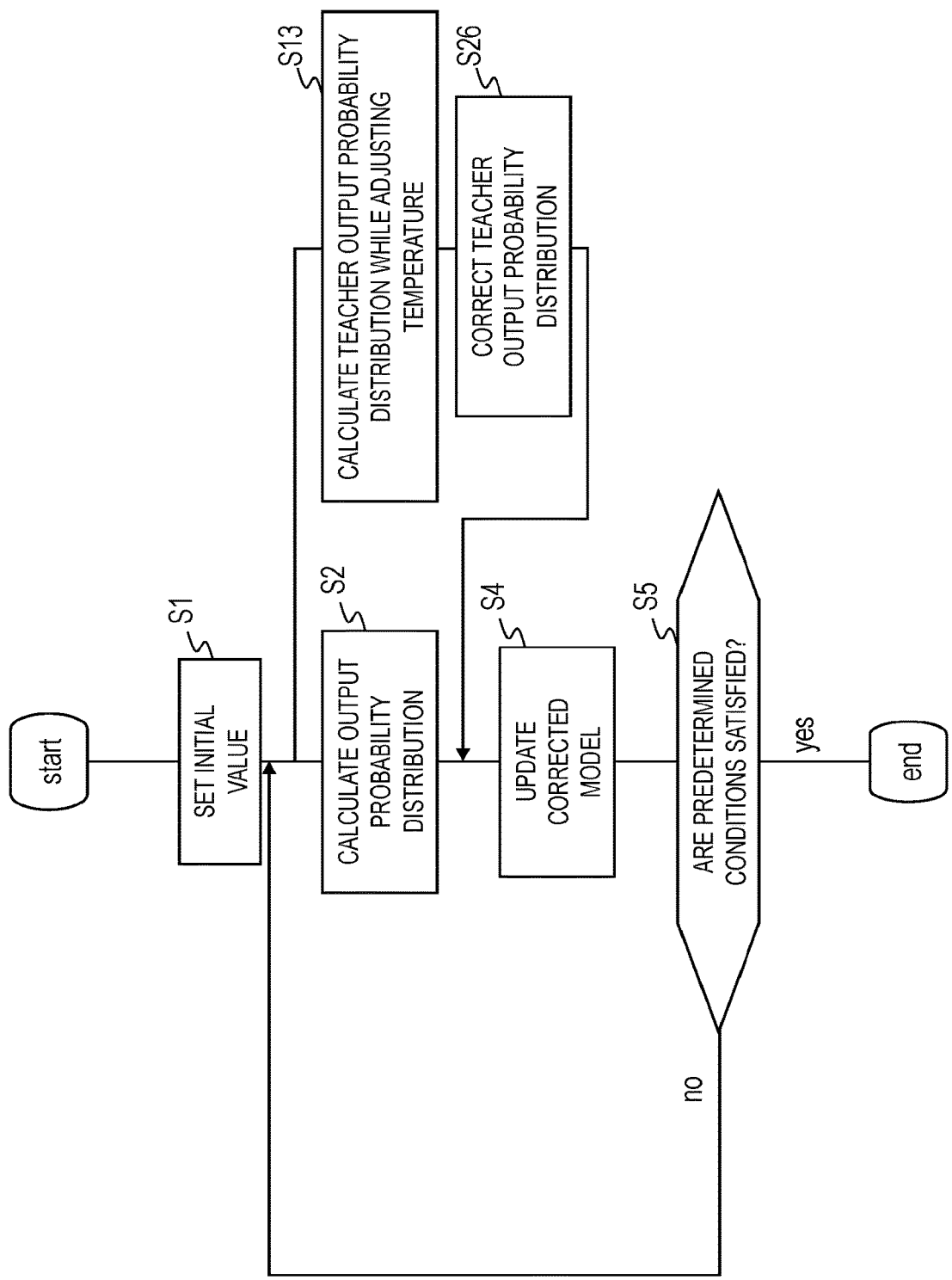
FIG. 10 is a diagram illustrating an example of a processing flow of the acoustic model learning apparatus according to the third embodiment.

FIG. 9 illustrates a functional block diagram of the acoustic model learning apparatus according to the third embodiment, and FIG. 10 illustrates a processing flow thereof.

The acoustic model learning apparatus 300 includes the output probability distribution calculating part 101, the corrected model updating part 102, the temperature adjustment and teacher output probability distribution calculating part 203, the initial value setting part 104, and a teacher output probability distribution correcting part 301. The third embodiment is different from the second embodiment mainly in that the teacher output probability distribution correcting part 301 is added. Note that it is also possible to employ a configuration where the temperature adjustment and teacher output probability distribution calculating part 203 is replaced with the teacher output probability distribution calculating part 103 (idea of the second embodiment is not used).

<Teacher Output Probability Distribution Correcting Part 301>

Input: distribution of output probabilities $p_1(j)$, correct unit number $j_L$

Output: corrected distribution of output probabilities $p_3(j)$

The teacher output probability distribution correcting part 301 corrects the distribution of the output probabilities $p_1(j)$ using the correct unit number $j_L$ to obtain the corrected distribution of output probabilities $p_3(j)$.

The teacher output probability distribution correcting part 301 specifies an output unit number K at which the output probabilities $p_1(j)$ become the greatest with reference to the distribution of the output probabilities $p_1(j)$.

[Formula 9]

$$K = \arg\max_j p_1(j) \quad (21)$$

Note that, because K becomes the same value as K obtained at the temperature adjustment and teacher output probability distribution calculating part 203, the temperature adjustment and teacher output probability distribution calculating part 203 may output K, and K is used as input of the teacher output probability distribution correcting part 301. However, in the case where a configuration is employed where the temperature adjustment and teacher output probability distribution calculating part 203 is replaced with the teacher output probability distribution calculating part 103, it is necessary to specify an output unit number K at which the output probabilities $p_1(j)$ become the greatest using equation (21), or the like.

Further, the teacher output probability distribution correcting part 301 determines whether or not K is equal to the correct unit number $j_L$. In the case where K is equal to the correct unit number $j_L$, the distribution of the output probabilities $p_1(j)$ is output as is as a corrected distribution of the output probabilities $p_3(j)$.

In the case where K is different from the correct unit number $j_L$, a distribution of output probabilities in which an output probability $p_1(K)$ of a K-th output unit is replaced with an output probability $p_1(j_L)$ of an output unit corresponding to the correct unit number $j_L$ among the distribution of the output probabilities $p_1(j)$ is created as a corrected distribution of output probabilities $p_3(j)$, and output.

<Effects>

With the processing described above, because it is ensured that a probability value corresponding to the correct unit number $j_L$ becomes the greatest in the corrected distribution of the output probabilities, it is possible to prevent a problem that an error in the teacher model is transferred.

Modified Example 1

The modified example of the second embodiment and the present embodiment may be combined. That is, it is also possible to employ a configuration where the initial value setting part 104 is not included. In this case, the acoustic model learning apparatus 300 includes the output probability distribution calculating part 101, the corrected model updating part 102, the temperature adjustment and teacher output probability distribution calculating part 203, and the teacher output probability distribution correcting part 301.

Figure 11:
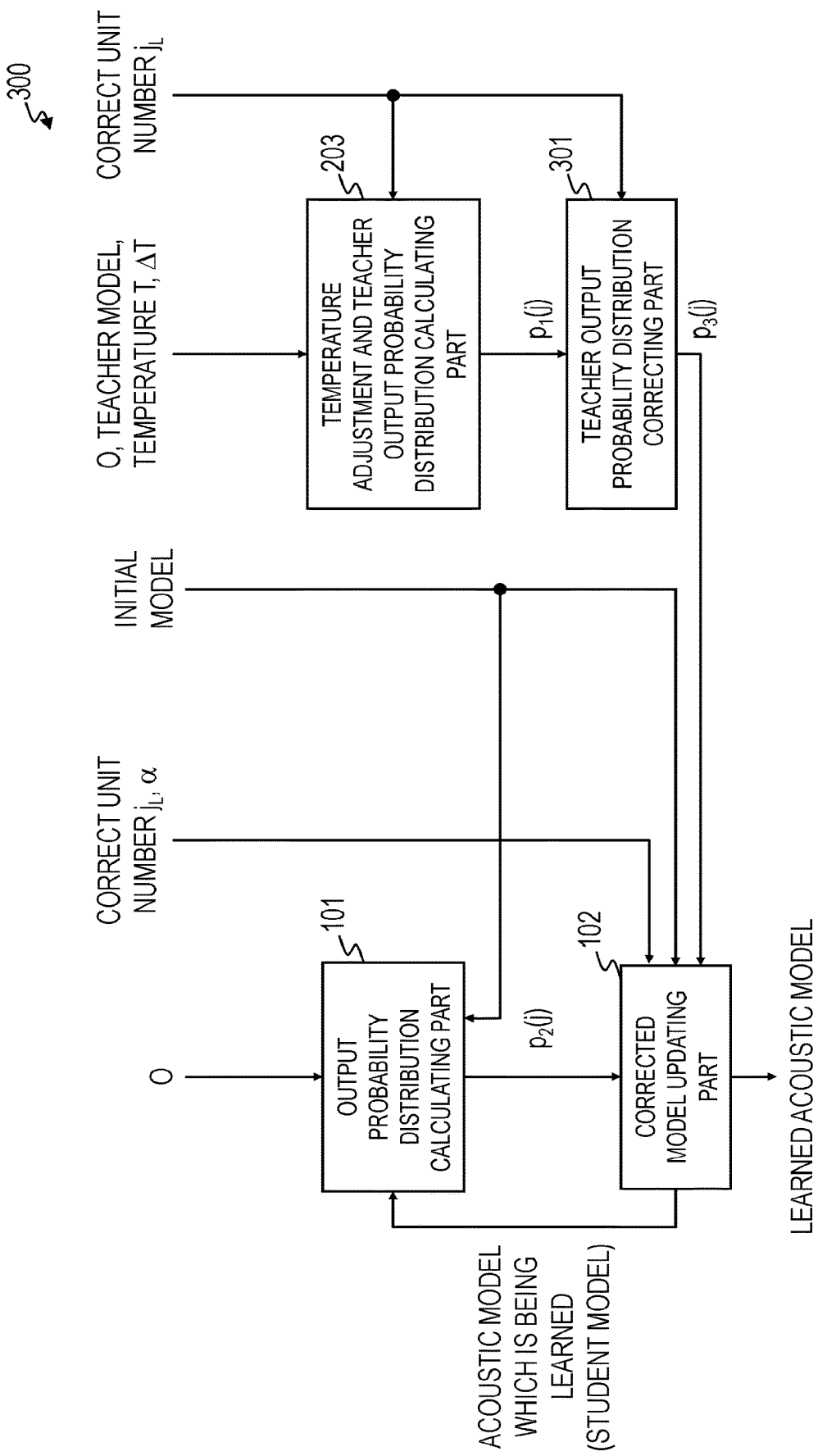
FIG. 11 is a functional block diagram of an acoustic model learning apparatus according to modified example 1 of the third embodiment.
Figure 12:
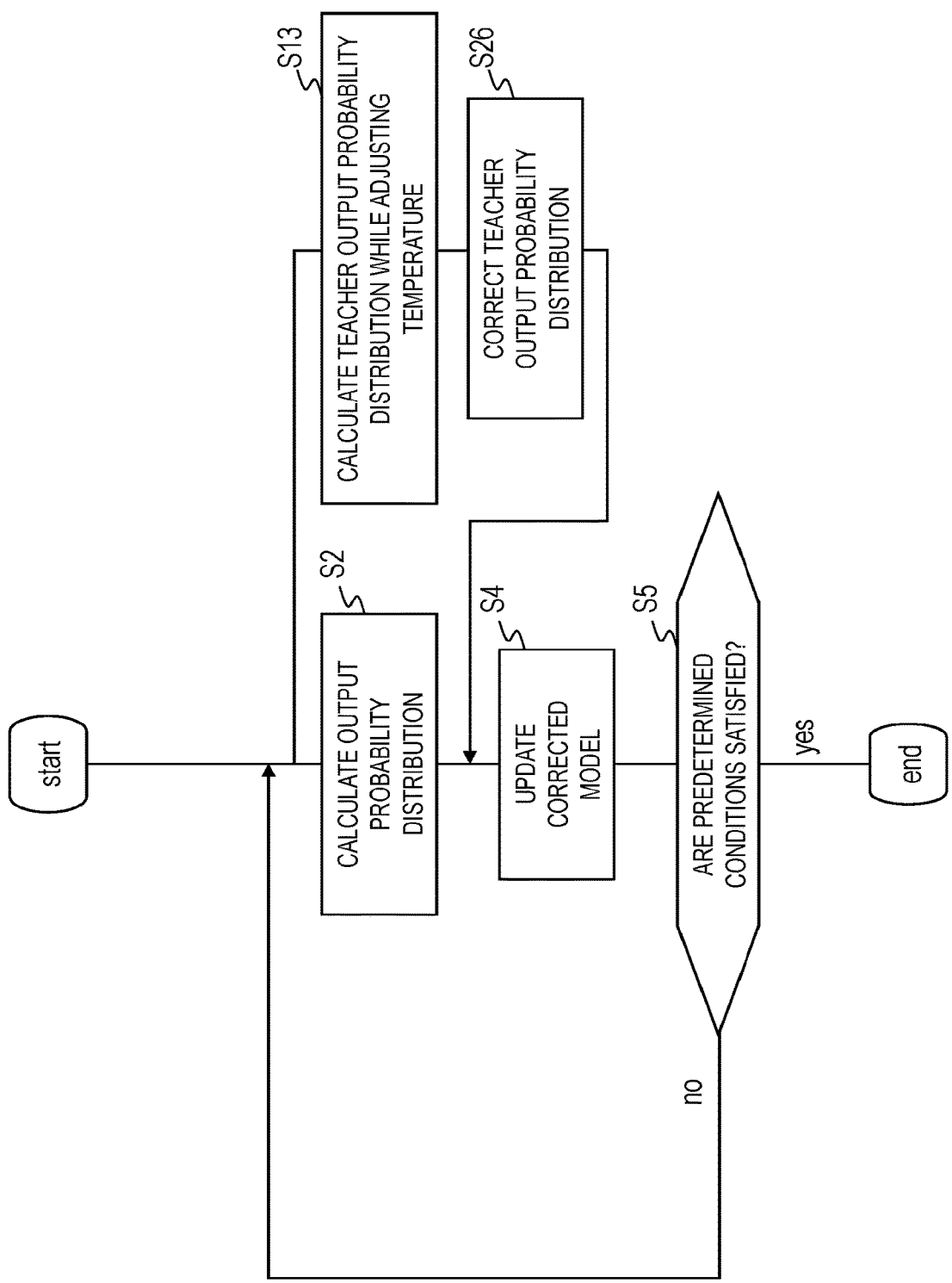
FIG. 12 is a diagram illustrating an example of a processing flow of the acoustic model learning apparatus according to modified example 1 of the third embodiment.

FIG. 11 illustrates a functional block diagram of an acoustic model learning apparatus according to modified example 1 of the third embodiment, and FIG. 12 illustrates a processing flow thereof. Processing of each part is as described in the third embodiment, the modified example of the second embodiment, or the like.

Also with such a configuration, it is possible to reduce a problem of errors in the teacher model and create an acoustic model with high accuracy.

Modified Example 2

In modified example 1, it is also possible to use the teacher output probability distribution calculating part 303 which does not use the temperature T and the temperature adjustment width ΔT, in place of the temperature adjustment and teacher output probability distribution calculating part 203. In this case, the acoustic model learning apparatus 300 includes the output probability distribution calculating part 101, the corrected model updating part 102, the teacher output probability distribution calculating part 303 and the teacher output probability distribution correcting part 301.

Figure 13:
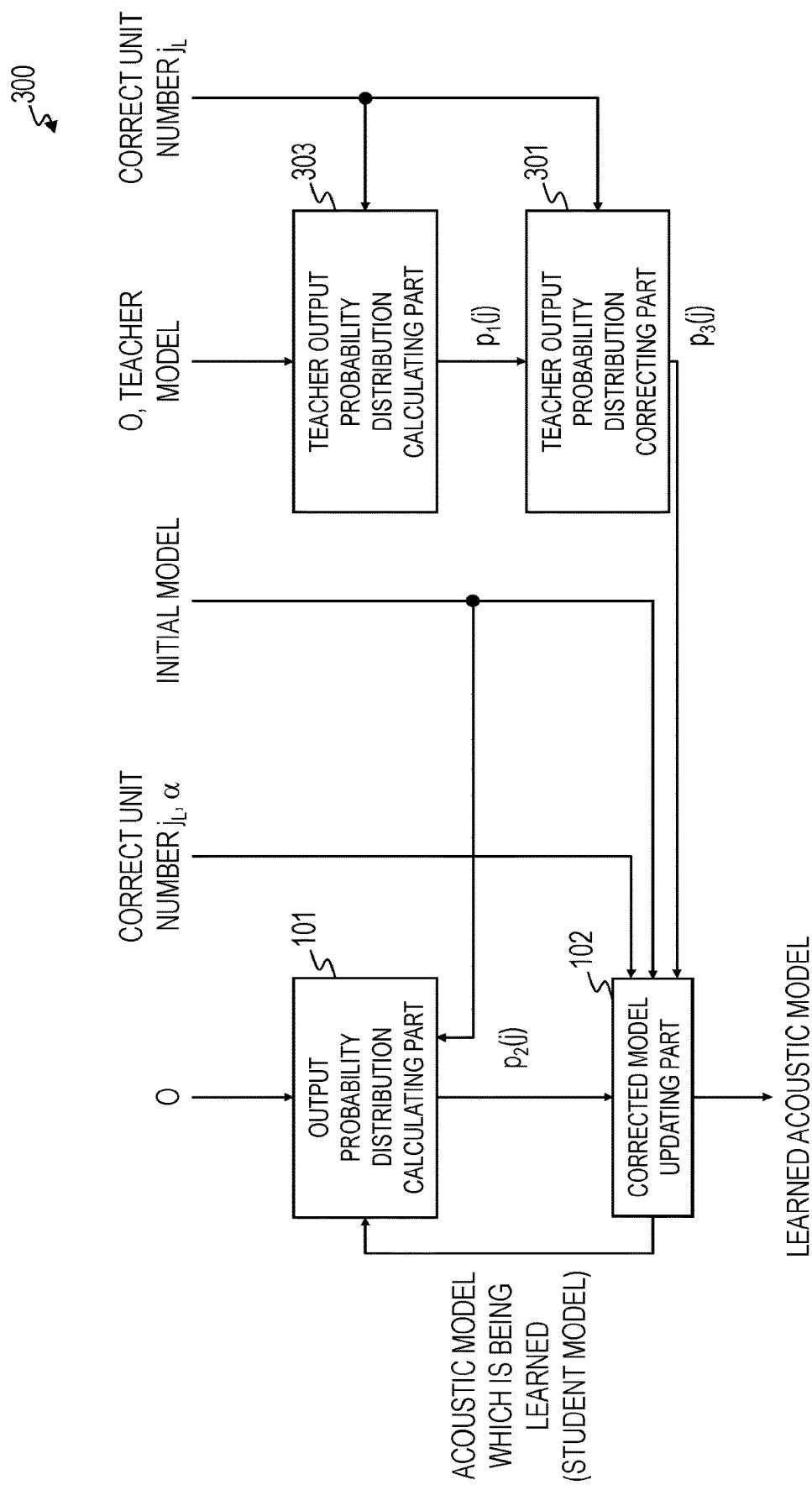
FIG. 13 is a functional block diagram of an acoustic model learning apparatus according to modified example 2 of the third embodiment.
Figure 14:
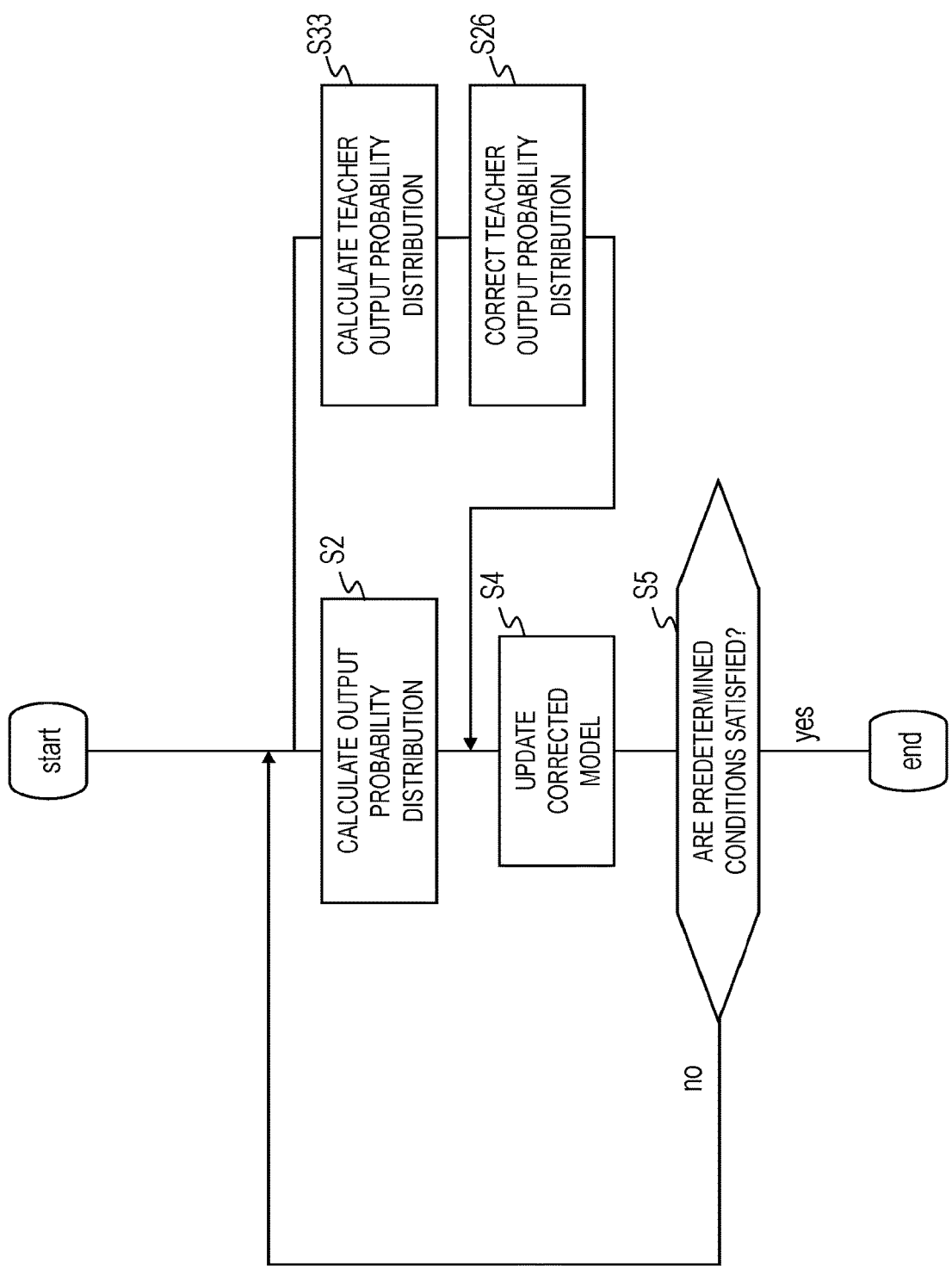
FIG. 14 is a diagram illustrating an example of a processing flow of the acoustic model learning apparatus according to modified example 2 of the third embodiment.

FIG. 13 illustrates a functional block diagram of an acoustic model learning apparatus according to modified example 2 of the third embodiment, and FIG. 14 illustrates a processing flow thereof.

Modified example 2 is different from modified example 1 of the third embodiment mainly in that the temperature is not used at the teacher output probability distribution calculating part 303. Processing of the teacher output probability distribution calculating part 303 is as described below.

<Teacher Output Probability Distribution Calculating Part 303>

Input: feature amount O for learning, teacher model
Output: output probability distribution (distribution of output probabilities $p_1(j)$)

The teacher output probability distribution calculating part 303 calculates an output probability distribution including a distribution of output probabilities $p_1(j)$ of respective units of an output layer using the feature amount O obtained from the acoustic signal for learning and the teacher model (S33). Any known technique may be used as a method for calculating the output probabilities $p_1(j)$, and an optimum method may be selected as appropriate in accordance with a usage environment, or the like. For example, the output probabilities $p_1(j)$ may be obtained using the method in Related Art 1. In this case, the output probabilities $p_1(j)$ are expressed with the following equation.

[Formula 10]

$$p_1(j) = \frac{\exp(x_j)}{\sum_k \exp(x_k)}$$

Also with such a configuration, it is possible to reduce a problem of errors in the teacher model and create an acoustic model with high accuracy.

Modified Example 3

In modified example 1, it is also possible to use the teacher output probability distribution calculating part 103 which does not use the temperature adjustment width ΔT in place of the temperature adjustment and teacher output probability distribution calculating part 203. In this case, the acoustic model learning apparatus 300 includes the output probability distribution calculating part 101, the corrected model updating part 102, the teacher output probability distribution calculating part 103 and the teacher output probability distribution correcting part 301.

Figure 15:
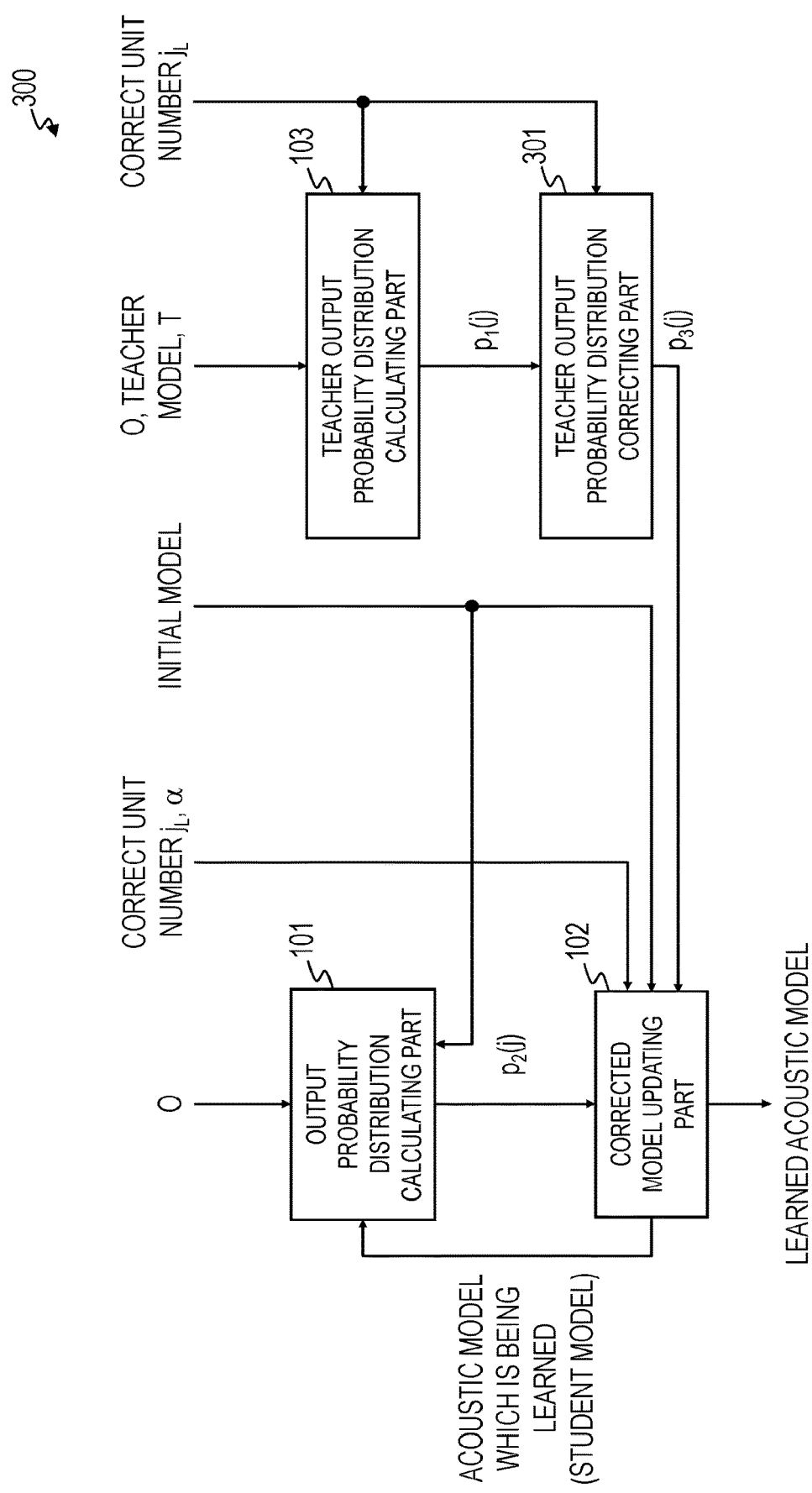
FIG. 15 is a functional block diagram of an acoustic model learning apparatus according to modified example 3 of the third embodiment.
Figure 16:
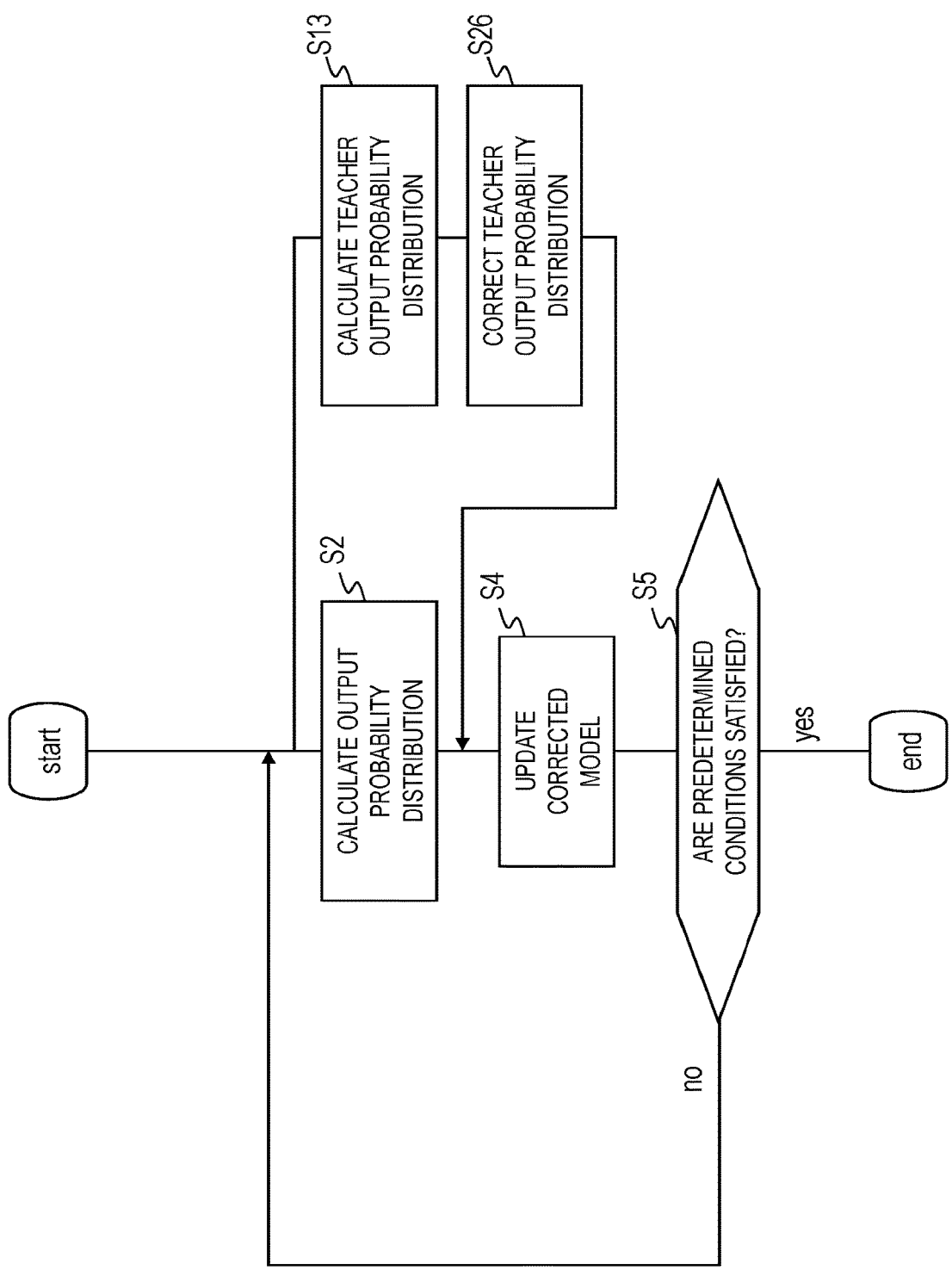
FIG. 16 is a diagram illustrating an example of a processing flow of the acoustic model learning apparatus according to modified example 3 of the third embodiment.

FIG. 15 illustrates a functional block diagram of an acoustic model learning apparatus according to modified example 3 of the third embodiment, and FIG. 16 illustrates a processing flow thereof.

Modified example 3 is different from modified example 2 of the third embodiment mainly in that the temperature T is used at the teacher output probability distribution calculating part 103. However, modified example 3 is different from the third embodiment in that the temperature adjustment width ΔT is not used. Note that processing content of the teacher output probability distribution calculating part 103 is as described in the first embodiment.

Also with such a configuration, it is possible to reduce a problem of errors in the teacher model and create an acoustic model with high accuracy.

OTHER MODIFIED EXAMPLES

The present invention is not limited to the above-described embodiments and modified examples. For example, the above-described various kinds of processing may be executed in parallel or individually in accordance with processing capabilities of apparatuses which execute processing or as necessary, as well as being executed in chronological order in accordance with the description. Further, change can be made as appropriate within the scope not deviating from the gist of the present invention.

<Program and Recording Medium>

Further, various kinds of processing functions at respective apparatuses described in the above-described embodiments and modified examples may be implemented with a computer. In this case, processing content of functions to be provided at the respective apparatuses are described with a program. By this program being executed at a computer, various kinds of processing functions at the above-described respective apparatuses are executed on the computer.

The program which describes the processing content can be recorded in a computer-readable recording medium. Any medium such as, for example, a magnetic recording apparatus, an optical disk, a magneto-optical recording medium and a semiconductor memory can be used as the computer-readable recording medium.

Further, this program is distributed by, for example, selling, transferring or lending a portable recording medium such as a DVD and a CD-ROM in which the program is recorded. Still further, this program may be distributed by the program being stored in a storage apparatus of a server computer and transferred from the server computer to another computer over a network.

The computer which executes such a program, for example, first once stores the program recorded in the portable recording medium or the program transferred from the server computer, in a storage part of the computer. Then, upon execution of the processing, this computer reads out the program stored in the storage part of the computer and executes processing in accordance with the read program. Further, as another embodiment of this program, the computer may directly read out the program from the portable recording medium and execute processing in accordance with the program. Further, this computer may sequentially execute processing in accordance with the received program every time the program is transferred from the server computer to the computer. Further, it is also possible to employ a configuration where, without transferring the program from the server computer to the computer, the above-described processing is executed through so-called ASP (Application Service Provider)-type service which implements processing functions only through the instruction of execution and acquisition of a result. Note that the program includes one equivalent to a program which is information to be provided for processing by an electronic computer (such as data having property of specifying processing of the computer, although the data is not a direct command to the computer).

Further, while a configuration is employed where respective apparatuses are configured by predetermined programs being executed on the computer, it is also possible to realize at least part of the processing content with hardware.

What is claimed is:

1. An acoustic model learning apparatus comprising:
   processing circuitry configured to:
     execute a first output probability distribution calculating processing in which the processing circuitry calculates a first output probability distribution including a distribution of output probabilities of respective units of an output layer using a feature amount obtained from an acoustic signal for learning and a learned first acoustic model including a neural network;
     execute a second output probability distribution calculating processing in which the processing circuitry calculates a second output probability distribution including a distribution of output probabilities of respective units of an output layer using the feature amount obtained from the acoustic signal for learning, and a second acoustic model which is different from the first acoustic model and which includes a neural network; and
     execute a corrected model updating processing in which the processing circuitry calculates a second loss function from a correct unit number corresponding to the acoustic signal for learning and the second output probability distribution, calculates a cross entropy of the first output probability distribution and the second output probability distribution, obtains a weighted sum of the second loss function and the cross entropy, and updates a parameter of the second acoustic model so that the weighted sum decreases,
   wherein in the first output probability distribution calculating processing the processing circuitry obtains the first output probability distribution using a smoothing parameter made up of a real value greater than 0 as input so that the first output probability distribution approaches a uniform distribution as the smoothing parameter is greater, and calculates the first output probability distribution by obtaining logits of respective units of an output layer using the feature amount obtained from the acoustic signal for learning and the first acoustic model, and setting a value of the smoothing parameter greater in a case where an output unit number with the greatest logit value is different from the correct unit number, than in a case where the output unit number with the greatest logit value matches the correct unit number.

2. The acoustic model learning apparatus according to claim 1,
   the processing circuitry being further configured to:
     execute a first output probability distribution correcting processing in which the processing circuitry sets a distribution of output probabilities in which, in a case where, among logits of respective units of an output layer obtained using the feature amount obtained from the acoustic signal for learning and the first acoustic model, an output unit number with the greatest logit value is different from the correct unit number, an output probability of an output unit corresponding to the output unit number with the greatest logit value is replaced with an output probability of an output unit corresponding to the correct unit number in the first output probability distribution, as a corrected first output probability distribution,
   wherein in the corrected model updating processing the processing circuitry uses the corrected first output probability distribution.

3. An acoustic model learning apparatus comprising:
   processing circuitry configured to:
     execute a first output probability distribution calculating processing in which the processing circuitry calculates a first output probability distribution including a distribution of output probabilities of respective units of an output layer using a feature amount obtained from an acoustic signal for learning and a learned first acoustic model including a neural network;
     execute a second output probability distribution calculating processing in which the processing circuitry calculates a second output probability distribution including a distribution of output probabilities of respective units of an output layer using the feature amount obtained from the acoustic signal for learning, and a second acoustic model which is different from the first acoustic model and which includes a neural network;
     execute a first output probability distribution correcting processing in which the processing circuitry sets a distribution of output probabilities in which, in a case where, among logits of respective units of an output layer obtained using the feature amount obtained from the acoustic signal for learning and the first acoustic model, an output unit number with the greatest logit value is different from a correct unit number corresponding to the acoustic signal for learning, an output probability of an output unit corresponding to the output unit number with the greatest logit value is replaced with an output probability of an output unit corresponding to the correct unit number in the first output probability distribution, as a corrected first output probability distribution; and execute a corrected model updating processing in which the processing circuitry calculates a second loss function from the correct unit number and the second output probability distribution, calculates a cross entropy of the corrected first output probability distribution and the second output probability distribution, obtains a weighted sum of the second loss function and the cross entropy, and updates a parameter of the second acoustic model so that the weighted sum decreases.

4. The acoustic model learning apparatus according to claim 3, wherein in the first output probability distribution calculating processing the processing circuitry obtains the first output probability distribution using a smoothing parameter made up of a real value greater than 0 as input so that the first output probability distribution approaches a uniform distribution as the smoothing parameter is greater.

5. The acoustic model learning apparatus according to any one of claims 1 to 4, the processing circuitry being further configured to:
execute an initial value setting processing in which the processing circuitry sets a parameter of the second acoustic model using a parameter of the first acoustic model, the first acoustic model and the second acoustic model including neural networks having similar structures.

6. An acoustic model learning method comprising:

a first output probability distribution calculating step of calculating a first output probability distribution including a distribution of output probabilities of respective units of an output layer using a feature amount obtained from an acoustic signal for learning and a learned first acoustic model including a neural network;

a second output probability distribution calculating step of calculating a second output probability distribution including a distribution of output probabilities of respective units of an output layer using the feature amount obtained from the acoustic signal for learning, and a second acoustic model which is different from the first acoustic model and which includes a neural network; and a corrected model updating step of calculating a second loss function from a correct unit number corresponding to the acoustic signal for learning and the second output probability distribution, calculating a cross entropy of the first output probability distribution and the second output probability distribution, obtaining a weighted sum of the second loss function and the cross entropy, and updating a parameter of the second acoustic model so that the weighted sum decreases, wherein, in the first output probability distribution calculating step, the first output probability distribution is obtained using a smoothing parameter made up of a real value greater than 0 as input so that the first output probability distribution approaches a uniform distribution as the smoothing parameter is greater, and the first output probability distribution is calculated by obtaining logits of respective units of an output layer using the feature amount obtained from the acoustic signal for learning and the first acoustic model, and setting a value of the smoothing parameter greater in a case where an output unit number with the greatest logit value is different from the correct unit number, than in a case where the output unit number with the greatest logit value matches the correct unit number.

7. An acoustic model learning method comprising:

a first output probability distribution calculating step of calculating a first output probability distribution including a distribution of output probabilities of respective units of an output layer using a feature amount obtained from an acoustic signal for learning and a learned first acoustic model including a neural network;

a second output probability distribution calculating step of calculating a second output probability distribution including a distribution of output probabilities of respective units of an output layer using the feature amount obtained from the acoustic signal for learning, and a second acoustic model which is different from the first acoustic model and which includes a neural network;

a first output probability distribution correcting step of setting a distribution of output probabilities in which, in a case where, among logits of respective units of an output layer obtained using the feature amount obtained from the acoustic signal for learning and the first acoustic model, an output unit number with the greatest logit value is different from a correct unit number corresponding to the acoustic signal for learning, an output probability of an output unit corresponding to the output unit number with the greatest logit value is replaced with an output probability of an output unit corresponding to the correct unit number in the first output probability distribution, as a corrected first output probability distribution; and a corrected model updating step of calculating a second loss function from the correct unit number and the second output probability distribution, calculating a cross entropy of the corrected first output probability distribution and the second output probability distribution, obtaining a weighted sum of the second loss function and the cross entropy, and updating a parameter of the second acoustic model so that the weighted sum decreases.

8. A non-transitory computer-readable recording medium that records a program for causing a computer to function as the acoustic model learning apparatus according to any one of claims 1 to 4.

9. A non-transitory computer-readable recording medium that records a program for causing a computer to function as the acoustic model learning apparatus according to claim 5.

* * * * *